(12) United States Patent
Kapinos et al.

(10) Patent No.: US 9,767,606 B2
(45) Date of Patent: Sep. 19, 2017

(54) AUTOMATIC MODIFICATION OF AUGMENTED REALITY OBJECTS

(71) Applicant: LENOVO (Singapore) PTE. LTD., New Tech Park (SG)

(72) Inventors: Robert James Kapinos, Durham, NC (US); Justin Tyler Dubs, Raleigh, NC (US); Axel Ramirez Flores, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/993,698

(22) Filed: Jan. 12, 2016

(65) Prior Publication Data

US 2017/0200310 A1 Jul. 13, 2017

(51) Int. Cl.
*G09G 5/00* (2006.01)
*G06T 19/00* (2011.01)

(52) U.S. Cl.
CPC .......... *G06T 19/003* (2013.01); *G06T 19/006* (2013.01)

(58) Field of Classification Search
CPC ....... G06T 15/04; G06T 11/001; G06T 11/40; G06T 15/80; G06T 19/003; G06T 19/006; G02B 27/0172
See application file for complete search history.

(56) References Cited

U.S. PATENT DOCUMENTS

| | | | | |
|---|---|---|---|---|
| 6,166,744 A | * | 12/2000 | Jaszlics | G06T 17/00 345/421 |
| 6,417,969 B1 | * | 7/2002 | DeLuca | G02B 27/2235 345/8 |
| 6,559,813 B1 | * | 5/2003 | DeLuca | G02B 27/22 345/629 |
| 7,639,208 B1 | * | 12/2009 | Ha | G02B 27/0172 345/204 |
| 8,279,168 B2 | * | 10/2012 | Glomski | G06F 3/011 345/156 |
| 8,990,682 B1 | * | 3/2015 | Wong | G02B 27/017 715/254 |
| 9,110,564 B2 | * | 8/2015 | Hwang | G06F 3/04817 |
| 9,147,111 B2 | * | 9/2015 | Fleck | G06K 9/00684 |
| 9,645,394 B2 | * | 5/2017 | Kinnebrew | G02B 27/017 |
| 2003/0219146 A1 | * | 11/2003 | Jepson | G06K 9/32 382/103 |
| 2004/0109009 A1 | * | 6/2004 | Yonezawa | G06T 19/006 345/632 |

(Continued)

OTHER PUBLICATIONS

Piekarski et al., Augmented Reality User Interface and Techniques for Outdoor Modelling, Apr. 2003.*

*Primary Examiner* — Devona E Faulk
*Assistant Examiner* — Charles L Beard
(74) *Attorney, Agent, or Firm* — Kunzler Law Group

(57) ABSTRACT

For automatic modification of augmented reality objects, a processor identifies an object of interest displayed by an augmented reality device. The processor identifies an obstruction object that obscures viewing the object of interest within the augmented reality device. The processor further selects one or more of the obstruction object and the object of interest to modify in accordance with a mitigation policy. In addition, the processor modifies the selected object in accordance with the mitigation policy.

14 Claims, 12 Drawing Sheets

(56) References Cited

U.S. PATENT DOCUMENTS

| | | | | |
|---|---|---|---|---|
| 2009/0066690 A1* | 3/2009 | Harrison | G06T 19/006 | 345/419 |
| 2010/0208057 A1* | 8/2010 | Meier | G06T 19/006 | 348/135 |
| 2011/0205242 A1* | 8/2011 | Friesen | G06F 3/011 | 345/633 |
| 2012/0206452 A1* | 8/2012 | Geisner | G02B 27/017 | 345/419 |
| 2013/0031511 A1* | 1/2013 | Adachi | G06F 9/4443 | 715/825 |
| 2013/0044128 A1* | 2/2013 | Liu | G09G 5/00 | 345/633 |
| 2013/0093788 A1* | 4/2013 | Liu | G06F 3/011 | 345/633 |
| 2013/0141421 A1* | 6/2013 | Mount | H04N 21/41407 | 345/419 |
| 2013/0208014 A1* | 8/2013 | Fleck | G06K 9/00684 | 345/672 |
| 2013/0215230 A1* | 8/2013 | Miesnieks | G06T 19/006 | 348/46 |
| 2013/0326364 A1* | 12/2013 | Latta | G06F 3/012 | 715/751 |
| 2014/0078175 A1* | 3/2014 | Forutanpour | G02B 27/017 | 345/633 |
| 2014/0132629 A1* | 5/2014 | Pandey | G02B 27/017 | 345/633 |
| 2014/0192164 A1* | 7/2014 | Tenn | H04N 13/0242 | 348/47 |
| 2014/0267792 A1* | 9/2014 | Mullins | G06T 19/006 | 348/207.1 |
| 2015/0062120 A1* | 3/2015 | Reisner-Kollmann | G06T 7/0042 | 345/419 |
| 2015/0077592 A1* | 3/2015 | Fahey | H04N 5/2224 | 348/239 |
| 2015/0091943 A1* | 4/2015 | Lee | G02B 27/0172 | 345/633 |
| 2015/0130790 A1* | 5/2015 | Vasquez, II | G06T 19/006 | 345/419 |
| 2015/0243079 A1* | 8/2015 | Cho | G02B 27/017 | 345/633 |
| 2015/0279103 A1* | 10/2015 | Naegle | G06T 19/006 | 345/633 |
| 2015/0302867 A1* | 10/2015 | Tomlin | G10L 25/48 | 704/270 |
| 2015/0302869 A1* | 10/2015 | Tomlin | G10L 25/78 | 704/246 |
| 2015/0332505 A1* | 11/2015 | Wang | G06T 19/006 | 345/633 |
| 2015/0363978 A1* | 12/2015 | Maimone | G02B 27/0172 | 345/633 |
| 2015/0371444 A1* | 12/2015 | Hara | G02B 27/017 | 345/633 |
| 2016/0025982 A1* | 1/2016 | Sutherland | G02B 27/0172 | 359/13 |
| 2016/0027215 A1* | 1/2016 | Burns | G02B 27/017 | 345/419 |
| 2016/0080732 A1* | 3/2016 | Pedley | H04N 13/0425 | 345/8 |
| 2016/0148433 A1* | 5/2016 | Petrovskaya | G06T 19/006 | 345/633 |
| 2016/0163107 A1* | 6/2016 | Chen | G06L 19/006 | 345/419 |
| 2016/0196692 A1* | 7/2016 | Kjallstrom | G06T 19/006 | 345/633 |
| 2016/0225187 A1* | 8/2016 | Knipp | G06T 19/006 | |
| 2016/0247319 A1* | 8/2016 | Nowatzyk | G02B 27/0172 | |
| 2016/0260251 A1* | 9/2016 | Stafford | G06T 19/003 | |
| 2016/0266386 A1* | 9/2016 | Scott | G06T 19/006 | |
| 2016/0275915 A1* | 9/2016 | Smyth | G06T 13/80 | |
| 2016/0371888 A1* | 12/2016 | Wright | G06F 3/011 | |
| 2017/0061691 A1* | 3/2017 | Scott | G06T 19/006 | |
| 2017/0061692 A1* | 3/2017 | Giraldi | G06T 19/006 | |
| 2017/0061702 A1* | 3/2017 | Christen | G06T 19/20 | |
| 2017/0120148 A1* | 5/2017 | Yim | A63F 13/52 | |

\* cited by examiner

250

AUTOMATIC MODIFICATION OF AUGMENTED REALITY OBJECTS

BACKGROUND

Field

The subject matter disclosed herein relates to augmented reality objects and more particularly relates to the automatic modification of augmented reality objects.

Description of the Related Art

The user of an augmented reality device may view both real objects and virtual objects. Occasionally, one object may obstruct the view of another object.

BRIEF SUMMARY

An apparatus for automatic modification of augmented reality objects is disclosed. The apparatus includes an augmented reality device, a processor, and a memory. The memory stores code executable by the processor. The processor identifies an object of interest displayed by the augmented reality device. The processor identifies an obstruction object that obscures viewing the object of interest within the augmented reality device. The processor further selects one or more of the obstruction object and the object of interest to modify in accordance with a mitigation policy. In addition, the processor modifies the selected object in accordance with the mitigation policy. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
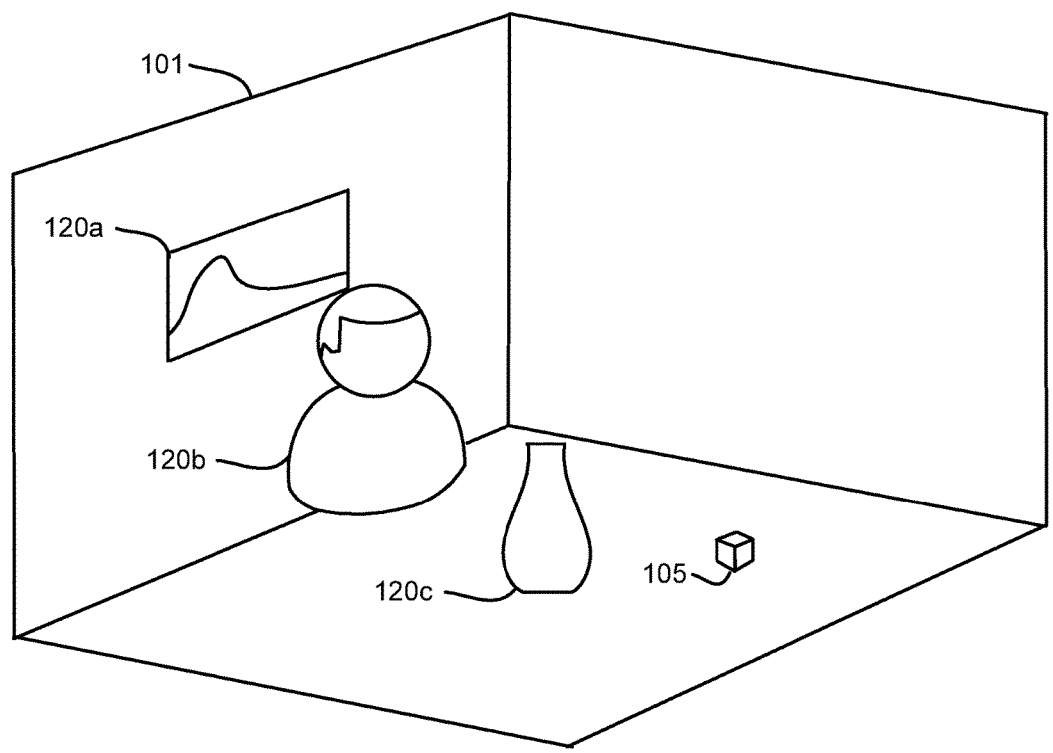
FIG. 1A is a perspective drawing illustrating one embodiment of virtual and real objects in a physical space.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a perspective drawing illustrating one embodiment of virtual objects 120*a-b* and a real object 120*c* in a physical space. An augmented reality device 105 is shown in a room 101. The augmented reality device 105 displays a plurality of objects 120*a-c* to a user. The objects 120*a-c* may be one of real objects 120 and virtual objects 120. Real objects 120 may be captured by a camera and rendered by the augmented reality device 105. Virtual objects 120 may be rendered by the augmented reality device from a video stream and/or geometry description. In the depicted embodiment, a wall display virtual object 120a and a person virtual object 120b are displayed by the augmented reality device 105. In addition, a vase real object 120c is also displayed by the augmented reality device 105.

In the depicted embodiment, each of the objects 120a-c are in the user's line of sight within the augmented reality device 105. As a result, the vase real object 120c may obscure the user's view of the wall display virtual object 120a and the person virtual object 120b. In addition, the person virtual object 120b may obscure the user's view of the wall display virtual object 120a.

The embodiments described herein identify an object of interest and an obstruction object from the objects 120. In addition, the embodiments select one or more of the obstruction object and the object of interest according to a mitigation policy. The embodiments further modify the selected object 120 in accordance with the mitigation policy. As a result, the object of interest is not obscured by the obstruction object and the user has an improved view of the object of interest within the augmented reality device 105.

Figure 1B:
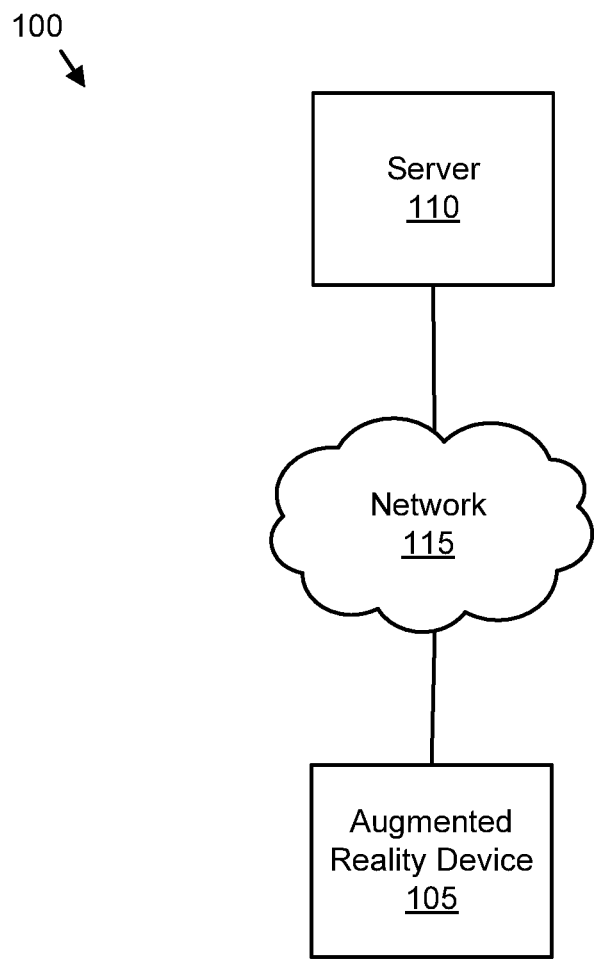
FIG. 1B is a schematic block diagram illustrating one embodiment of an augmented reality system.

FIG. 1B is a schematic block diagram illustrating one embodiment of an augmented reality system 100. In the depicted embodiment, the system 100 includes the augmented reality device 105, a server 110, and a network 115. The augmented reality device 105 may provide an immersive display for a user. In one embodiment, the augmented reality device displays both real objects 120 and virtual objects 120 to the user.

The augmented reality device 105 may be in communication with the network 115. The network 115 may be the Internet, a mobile telephone network, a local area network, a wide area network, a Wi-Fi network, or combinations thereof. In one embodiment, the augmented reality device 105 communicates through the network 115 with the server 110. The server 110 may communicate object data that describes virtual objects 120 to the augmented reality device 105. The augmented reality device 105 may render the object data as virtual objects 120. A camera embodied in the augmented realty device 105 may further capture images of real objects 120 and display the images of the real objects 120 within the augmented realty device 105.

Figure 2A:
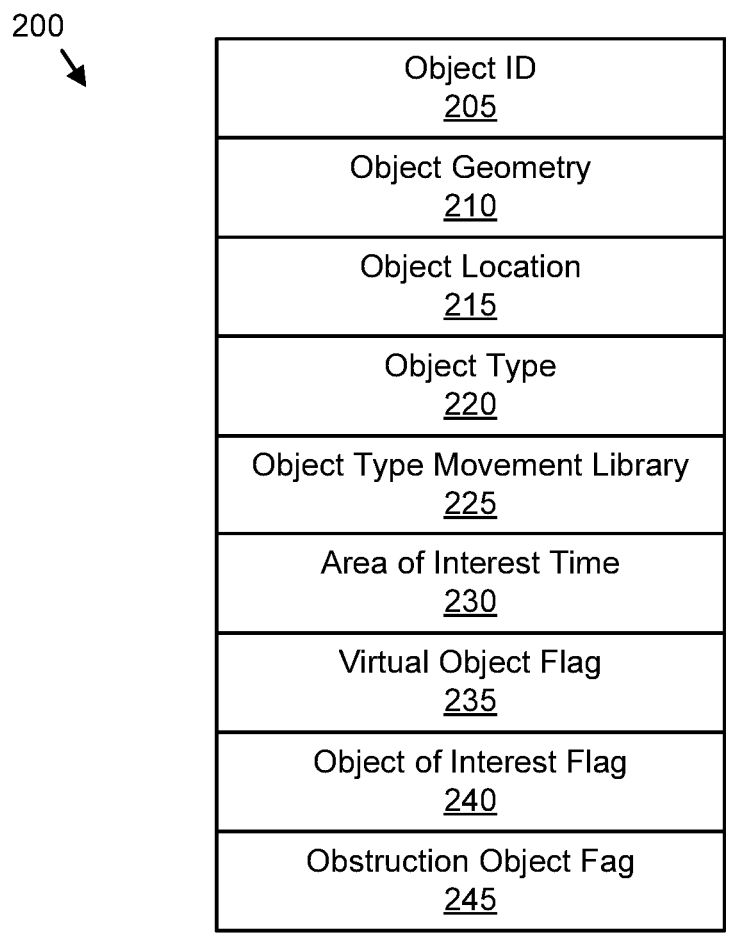
FIG. 2A is a schematic block diagram illustrating one embodiment of object data.

FIG. 2A is a schematic block diagram illustrating one embodiment of the object data 200. The object data 200 may be organized as a data structure in a memory. In the depicted embodiment, the object data 200 includes an object identifier 205, an object geometry 210, an object location 215, an object type 220, an object type movement library 225, an area of interest time 230, a virtual object flag 235, an object of interest flag 240, and an obstruction object flag 245.

The object identifier 205 may uniquely identify an object 120 that is rendered by the augmented reality device 105. The object 120 may be a virtual object. Alternatively, the object 120 may be a real object 120 that is recorded by a camera and displayed by the augmented reality device 105. In one embodiment, the object identifier 205 is an index string.

The object geometry 210 may describe the geometries of sub-objects that comprise the object 120. The object geometry 210 may also describe colors, hues, transparencies, texture maps, and the like that are associated with the sub-objects. Alternatively, the object geometry 210 may describe an outline of a real object 120 that is displayed by the augmented reality device 105.

The object location 215 may describe a physical location of a real object 120 within a scene. The object location 215 may be absolute coordinate such as Global Positioning System (GPS) coordinates, coordinates relative to an origin within the scene, and/or coordinates relative to the augmented reality device 105. Alternatively, the object location 215 may describe a virtual location of the object 120 relative to another virtual object 120.

The object type 220 may specify a type of the object 120. Object types 220 may include people, plants, animals, office furniture, vehicles, buildings, and the like. The object type movement library 225 may include entries for a plurality of the object types 220. Each entry in the object type movement library 225 may describe a natural-appearing manner of movement for the corresponding object type 220.

In one embodiment, if an object 120 is moved within the augmented reality display 105, the object 120 may be moved using the natural-appearing manner of movement for the object type 220 of the object 120. As a result, the movement of the object 120 may not appear distracting to the user of the augmented realty device 105.

The area of interest time 230 may describe a time interval that an object 120 is within an area of interest of the user. The object 120 may be identified as the object of interest if the area of interest time 230 exceeds an interest threshold. The interest threshold may be in the range of 1 to 3 seconds.

The virtual object flag 235 may be set if the object 120 is a virtual object 120. If the virtual object flag 235 is cleared, the object 120 may be a real object 120. The object of interest flag 240 may be set if the object 120 is identified as an object of interest. The obstruction object flag 245 may be set if the object 120 is identified as an obstruction object.

Figure 2B:
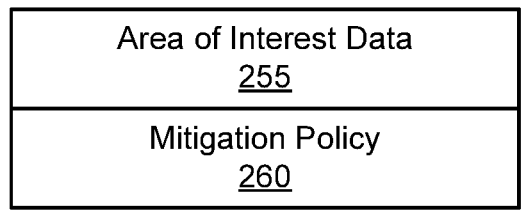
FIG. 2B is a schematic block diagram illustrating one embodiment of augmented reality data.

FIG. 2B is a schematic block diagram illustrating one embodiment of augmented reality data 250. The augmented reality data 250 may be organized as a data structure and stored in a memory. In the depicted embodiment, the augmented reality data 250 includes area of interest data 255 and a mitigation policy 260.

The area of interest data 255 may describe an area of interest for a user of the augmented reality device 105. In one embodiment, the area of interest data 255 describes a point on the display of the augmented reality device 105 where the user is focused. The area of interest data 255 may be determined by tracking the user's eyes.

In an alternative embodiment, the area of interest data 255 describes a fixed region of the display of the augmented reality device 105. For example, the area of interest data 255 may describe a circular region at the front of the display of the augmented reality device 105 with a view angle for the user of between 5 and 30 degrees.

The mitigation policy 260 may specify whether to select an object of interest object 120 or an obstruction object 120 for modification. In one embodiment, the selected object 120 is selected in accordance with the mitigation policy 260 to render the object of interest in an augmented reality device user line of sight. For example, in FIG. 1A, if the vase real object 120c is identified as the obstruction object and the person virtual object 120b is identified as the object of interest and both the vase real object 120c and the person virtual object 120b are in the user line of sight, the mitigation policy 260 may select the vase real object 120c so that the person virtual object 120b remains in the user line of sight.

In addition, the mitigation policy 260 may specify how to modify the selected object 120. The mitigation policy 260 may further direct the modification of the vase real object 120c by moving the vase real object 120c so that the person virtual object 120b remains in the user line of sight.

In one embodiment, the mitigation policy 260 specifies selecting an object 120 to minimize rendering computation. For example, if the mitigation policy 260 is deciding between selecting and moving a real object 120 and a virtual object 120 and moving the real object 120 requires more rendering computation, the mitigation policy 260 may select to move the real object 120.

Figure 3A:
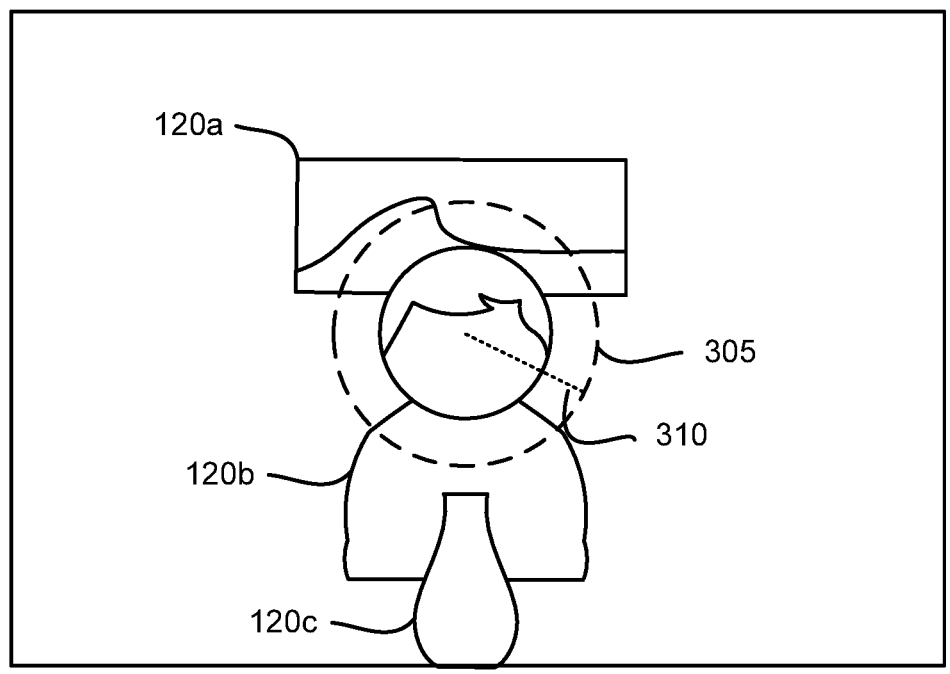
FIG. 3A is a front view drawing illustrating one embodiment of an area of interest.

FIG. 3A is a front view drawing illustrating one embodiment of the area of interest 305. In the depicted embodiment, the area of interest 305 is a circular region with a specified view angle 310. The view angle 310 may be the apparent angle of the area of interest 305 for the user. In one embodiment, an object 120 such as the person virtual object 120b is determined to be the object of interest if the person virtual object 120b is within the area of interest 305 an area of interest time 230 that exceeds the interest threshold.

Figure 3B:
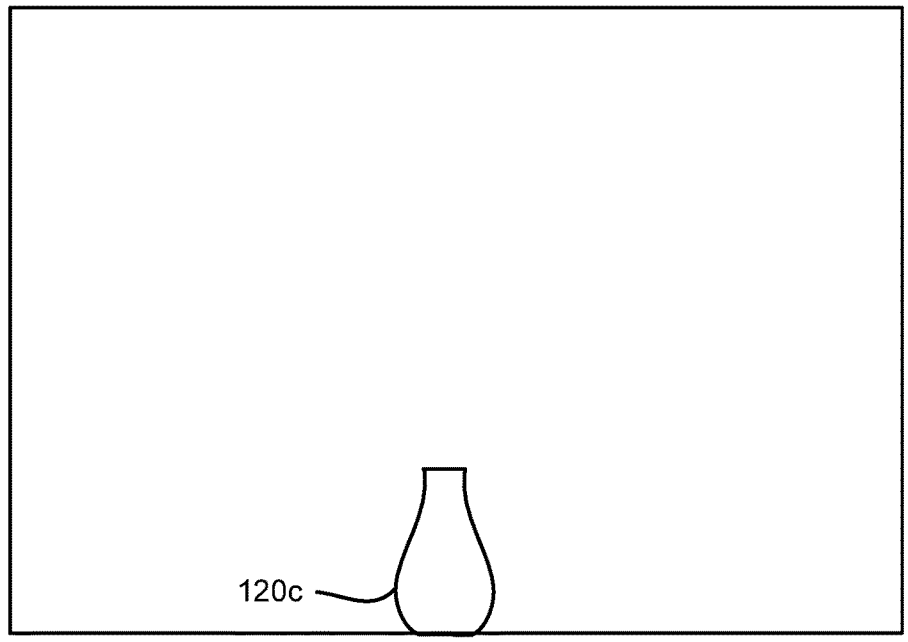
FIGS. 3B-C are front view drawings illustrating one embodiment of sequentially displaying objects.
Figure 3C:
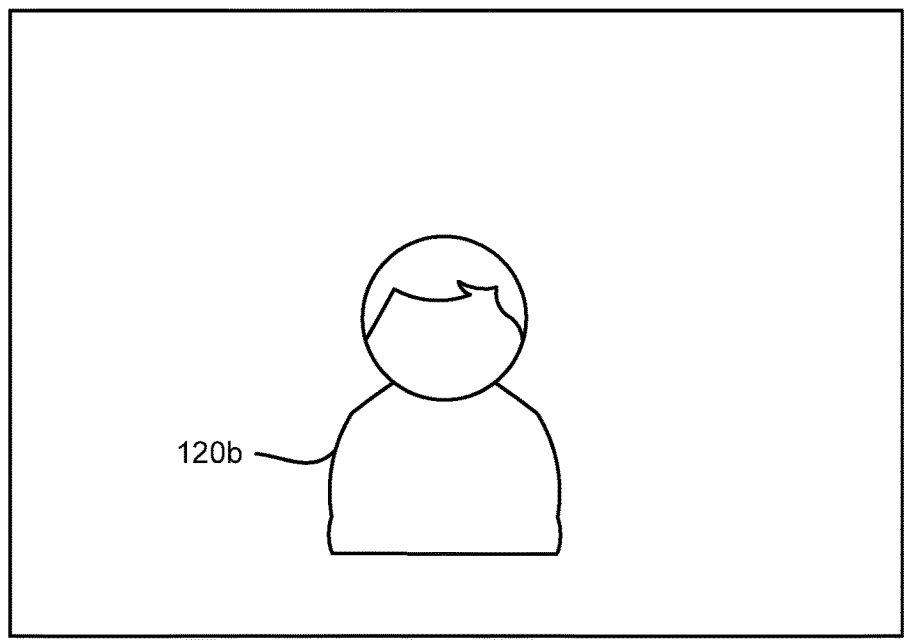

FIGS. 3B-C are front view drawings illustrating one embodiment of sequentially displaying objects 120. In one embodiment, objects 120 may be displayed sequentially to allow the user to make a selection of one of the objects 120. In FIG. 3B, the wall display virtual object 120a and the person virtual object 120b of FIG. 1A are not displayed by the augmented reality device 105. Instead, only the vase real object 120c is displayed. With only one object 120c displayed, the user may select the displayed object 120c. In FIG. 3C, the wall display virtual object 120a and the vase real object 120c are not displayed by the augmented reality device 105, while the person virtual object 120b is displayed. As a result, the user may select the person virtual object 120b as a selected object 120. In one embodiment, the augmented reality device 105 may sequentially display an object of interest and an obstruction object. A user may select one of the object of interest or the obstruction object as the selected object 120 is displayed.

Figure 3D:
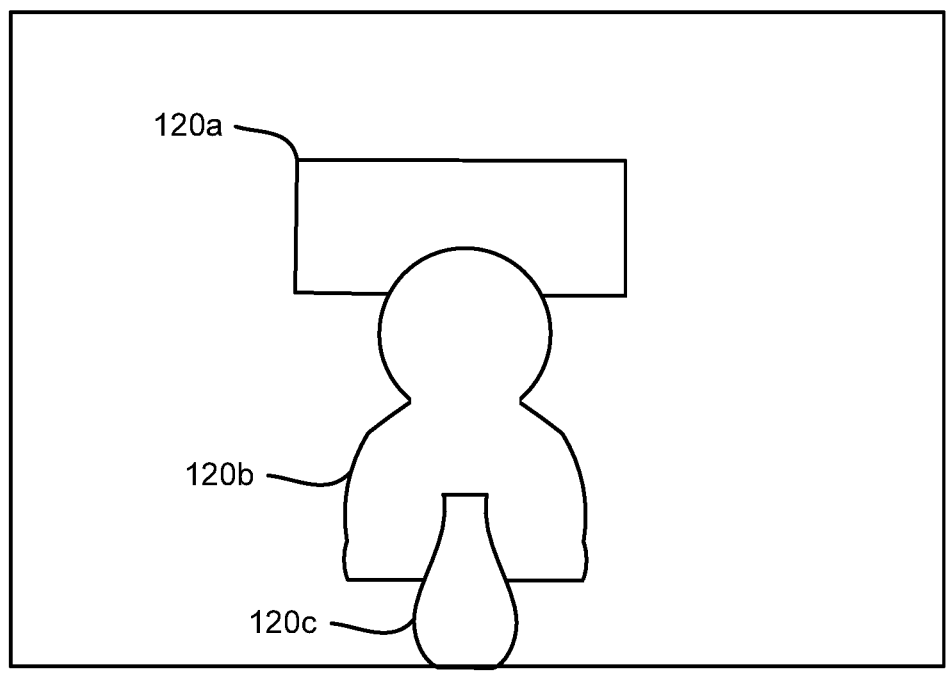
FIG. 3D is a front view drawing illustrating one embodiment of displaying object outlines.

FIG. 3D is a front view drawing illustrating one embodiment of displaying object outlines. In the depicted embodiment, the objects 120a-c of FIG. 1A are displayed as object outlines. The objects 120a-c may be displayed as object outlines to allow the user to select one of the objects 120a-c. The object outlines may include labels.

Figure 3E:
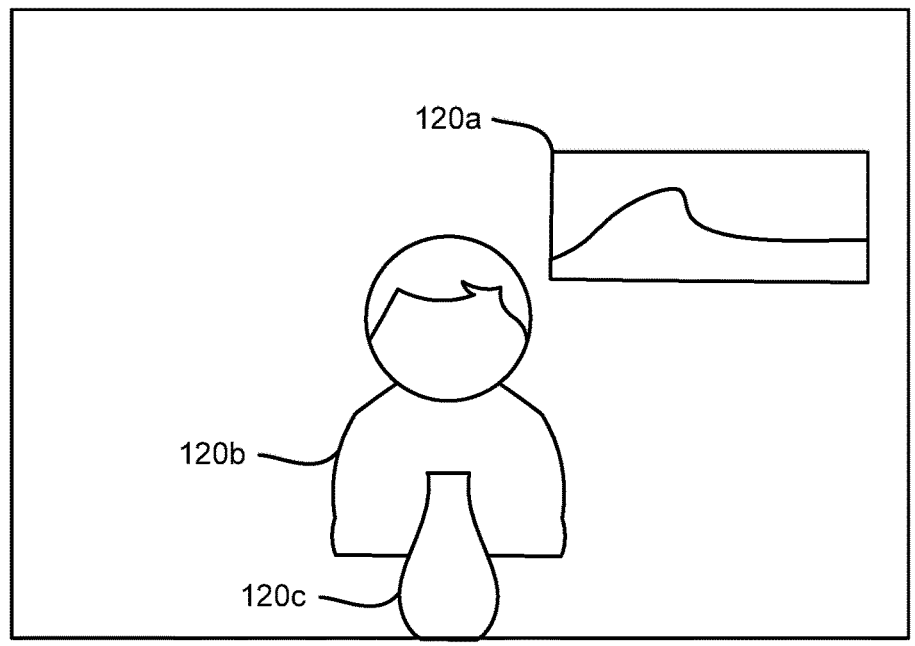
FIG. 3E is a front view drawing illustrating one embodiment of moving a selected object.

FIG. 3E is a front view drawing illustrating one embodiment of moving a selected object 120. In the depicted embodiment, the wall display virtual object 120a has been selected as the selected object 120 in accordance with the mitigation policy 260. The wall display virtual object 120a may be the object of interest. The augmented reality device 105 may modify the wall display virtual object 120a in accordance with the mitigation policy 260 by moving the wall display virtual object 120a. As a result, the wall display virtual object 120a is not of obscured by the person virtual object 120b. The wall display virtual object 120a may be selected to minimize render computation. In one embodiment, the wall display virtual object 120a may be moved in a natural-appearing manner as specified by the object type movement library 225. For example, the wall display virtual object 120a may be moved at a view angle angular rate of 5 degrees per second.

Figure 3F:
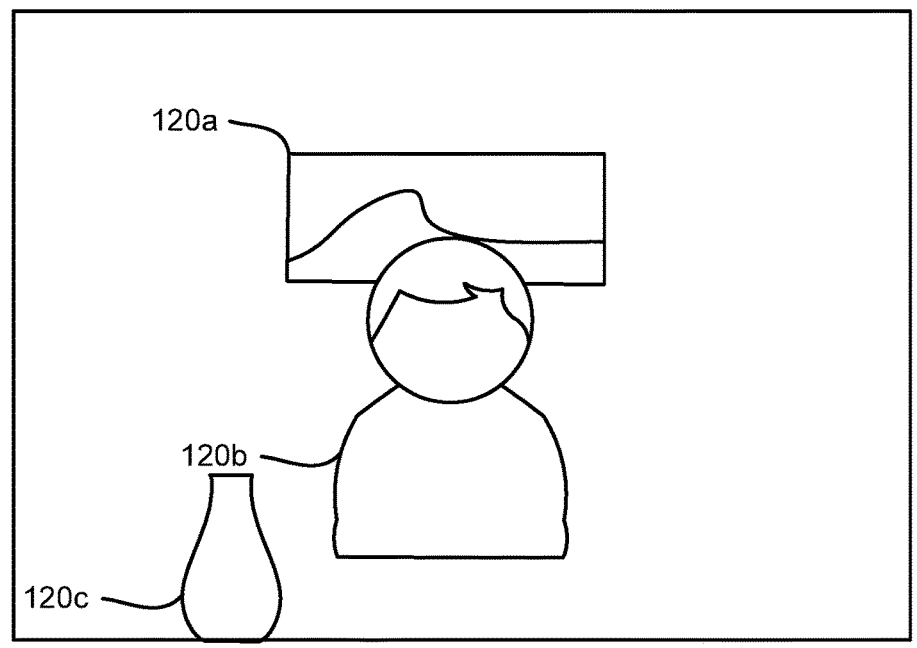
FIG. 3F is a front view drawing illustrating one alternate embodiment of moving a selected object.

FIG. 3F is a front view drawing illustrating one alternate embodiment of moving a selected object 120. In the depicted embodiment, the vase real object 120c has been selected as the selected object 120 in accordance with the mitigation policy 260. The person virtual object 120b may be identified as the object of interest. As a result, the vase real object 120c may be identified as the obstruction object.

The augmented reality device 105 may modify the vase real object 120c in accordance with the mitigation policy 260 by moving the vase real object 120c. The vase real object 120c may be moved to render the object of interest in the augmented reality device user line of sight. In one embodiment, the vase real object 120c may be moved in an unobtrusive manner as specified by the object type movement library 225. For example, the vase real object 120c may appear to fade out at an original position and concurrently fade in at a new position.

Figure 3G:
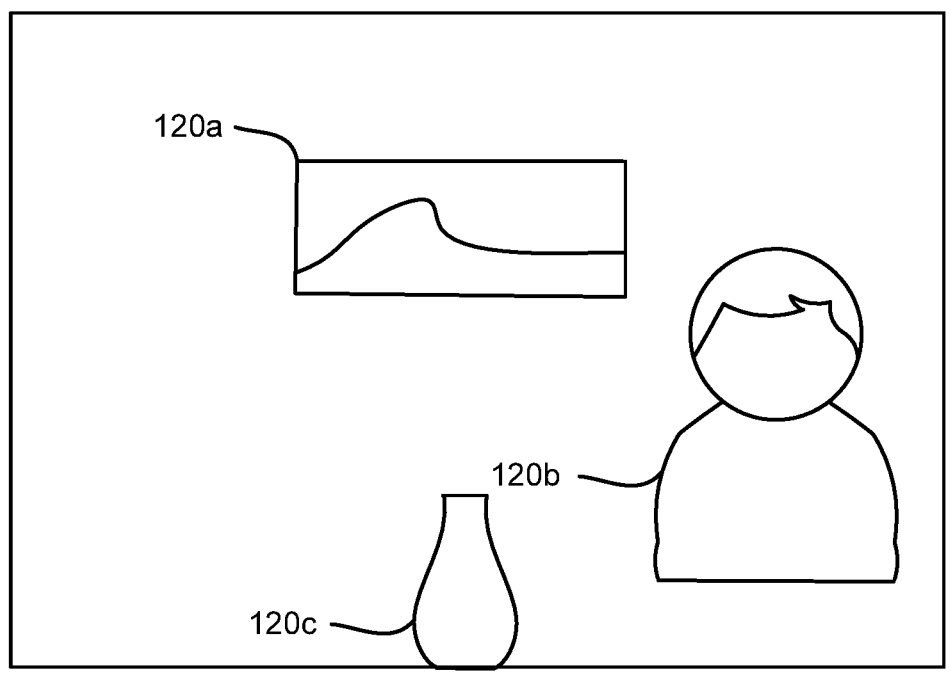
FIG. 3G is a front view drawing illustrating one alternate embodiment of moving a selected object.

FIG. 3G is a front view drawing illustrating one alternate embodiment of moving a selected object 120. In the depicted embodiment, the person virtual object 120b has been selected as the selected object 120 in accordance with the mitigation policy 260. The person virtual object 120b may be identified as the object of interest. In addition, the vase real object 120c may be identified as the obstruction object.

The augmentation policy 260 may specify selecting the selected object 120 to minimize rendering computation. If modifying the person virtual object 120b requires less rendering computation then modifying the vase real object 120c, the person virtual object 120b may be selected for modification. In addition, the augmented reality device 105 may move the person virtual object 120b as shown so that the vase real object 120c does not obscure the person virtual object 120b.

Figure 4:
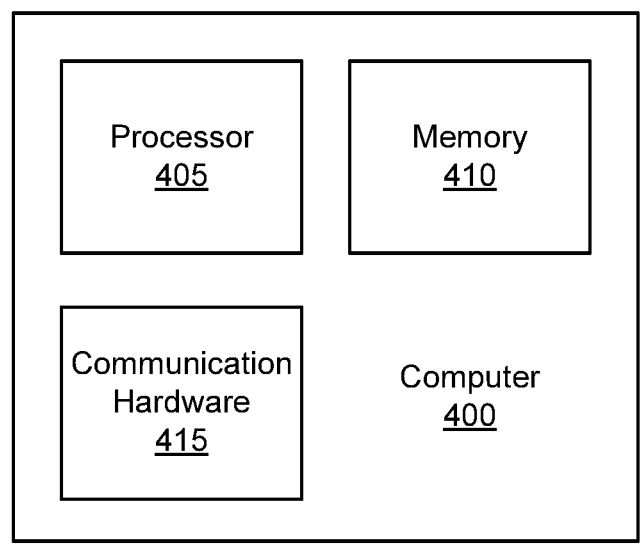
FIG. 4 is a schematic block diagram illustrating one embodiment of a computer.

FIG. 4 is a schematic block diagram illustrating one embodiment of a computer 400. The computer 400 may be embodied in the augmented reality device 105. Alternatively, the computer 400 may be embodied in the server 110. In the depicted embodiment, the computer 400 includes a processor 405, memory 410, and communication hardware 415. The memory 410 may include a semiconductor storage device, hard disk drive, an optical storage device, a micro-mechanical storage device, or combinations thereof. The memory 410 may store code. The processor 405 may execute the code. The communication hardware 415 may communicate with other devices. For example, the communication hardware 415 may communicate with the network 115.

Figure 5A:
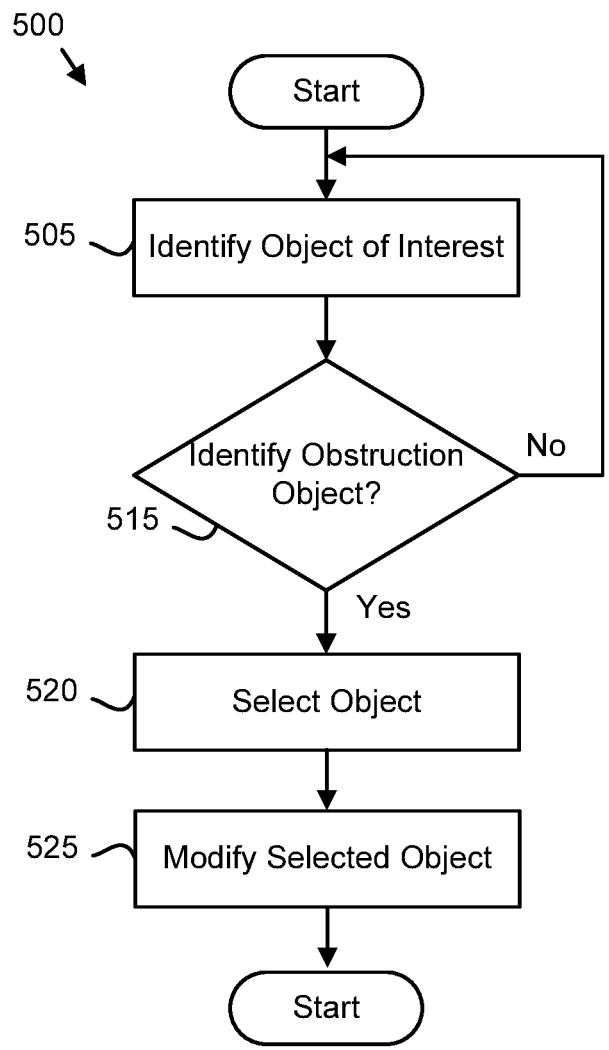
FIG. 5A is a schematic flow chart diagram illustrating one embodiment of an object modification method.

FIG. 5A is a schematic flow chart diagram illustrating one embodiment of an object modification method 500. The method 500 may identify an object of interest, identify an obstruction object, and select one or more of the obstruction object and the object of interest. In addition, the method 500 may modify the selected object 120. The method 500 may be performed by the processor 405.

The method 500 starts, and in one embodiment, the processor 405 identifies 505 the object of interest. The object of interest may be identified 505 from one or more objects 120 that are displayed by the augmented reality device 105. The identification 505 of the object of interest is described in more detail in FIG. 5B.

The processor 405 may further identify 515 an obstruction object. In one embodiment, the obstruction object is identified 515 as an object 120 that at least partially obscures the object of interest. In one embodiment, the obstruction object is identified 515 in response to an object 120 having an obstruction score that exceeds an obstruction threshold. The obstruction score OS may be calculated using Equation 1, where $p_i$ is one if an ith pixel of the object of interest is obscured by the object 120 and zero if the ith pixel is not obscured by the object 120, and $d_i$ is a distance from a center of the object of interest to the ith pixel.

$$OS = \Sigma p_i / d_i \qquad \text{Equation 1}$$

Alternatively, the processor 405 may identify 515 an object 120 as the obstruction object if the obstruction object flag 245 for the object 120 is set. The obstruction object flag 245 may be set for all real objects 120. The processor 405 may identify 515 one or more obstruction objects. If the obstruction object is not identified 515, the processor 405 continues to identify 505 the object of interest. If one or more obstruction objects are identified 515, the processor 405 may select 520 one or more of the obstruction objects or the object of interest as the selected object 120. The processor 405 may select 520 the selected object 120 in accordance with the mitigation policy 260.

The processor 405 may modify 525 the selected object 120 and the method 500 ends. In one embodiment, the processor 405 moves the selected object 120 as illustrated FIGS. 3E-G. The selected object 120 may be moved in a natural-appearing manner as specified by the object type movement library 225. For example, if the processor 405 modifies the person virtual object 120*b* and/or a person real object 120, the processor 405 may render a person walking to a new location, standing and walking to a new location, or the like.

If the selected object 120 is a real object 120, the processor 405 may modify 525 the selected real object 120 by deleting an image of the selected real object 120 that corresponds to a physical location of the selected real object 120 within the augmented reality display 105. In addition, the processor 405 may render the image of the selected real object 120 at a virtual location. The processor 405 may modify 525 the selected real object 120 by sequentially deleting and re-rendering the images of the selected real object 120 at a succession of locations to simulate the selected real object 120 moving in a natural-appearing manner.

Figure 5B:
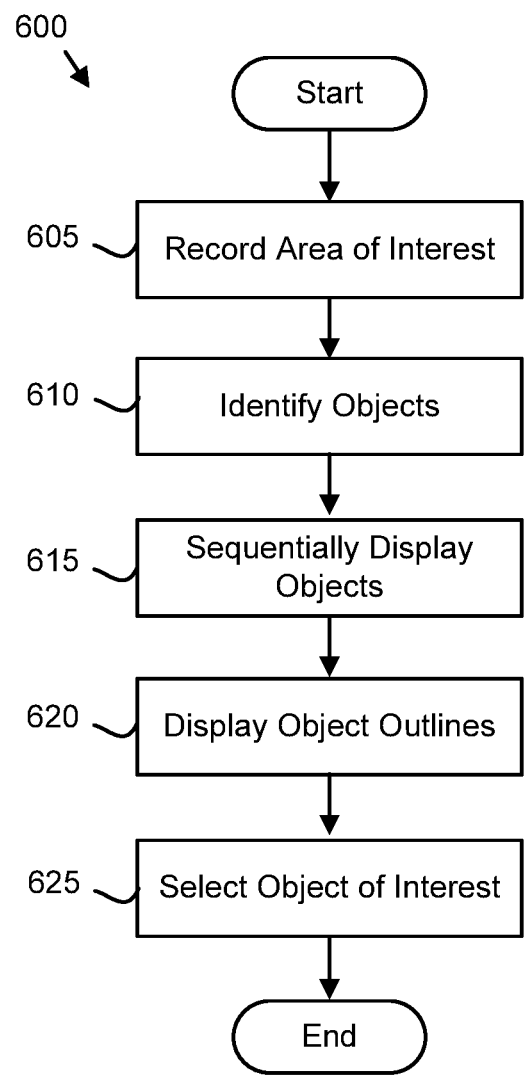
FIG. 5B is a schematic flow chart diagram illustrating one embodiment of an object of interest identification method.

FIG. 5B is a schematic flow chart diagram illustrating one embodiment of an object of interest identification method 600. The method 600 may identify the object of interest as described in step 505 of FIG. 5A. The method 600 may be performed by the processor 405.

The method 600 starts, and in one embodiment, the processor 405 records the area of interest 305 of the display of the augmented reality device 105. In addition, the processor 405 may identify 610 objects 120 that are displayed by the augmented reality device 105. In one embodiment, the processor 405 identifies 610 the objects 120 by using an edge filter to identify 610 a plurality of objects 120. In addition, the processor 405 may generate object data 200 for each object 120. In one embodiment, the processor 405 initially only identifies 610 objects 120 that are within the area of interest 305.

In one embodiment, the processor 405 sequentially displays 615 the objects 120. The processor 405 may sequentially display 615 the objects 120 as depicted in FIGS. 3B-C. The processor 405 may render the image of the displayed object 120 while deleting the image of un-displayed objects 120. By sequentially displaying 615 the objects, the user may select a single object 120.

In an alternative embodiment, the processor 405 displays 620 object outlines of the objects 120. The processor 405 may display 620 the object outlines as shown in FIG. 3D. Displaying 620 the object outlines may allow the user to select a single object 120.

The processor 405 further selects 625 the object of interest and the method 600 ends. In one embodiment, the processor 405 selects 625 the object 120 with a set object of interest flag 240 in the corresponding object data 200. For example, if the augmented reality device 105 is displaying the person virtual object 120*b* making a presentation, the object of interest flag 240 for the person virtual object 120*b* may be automatically set to select 625 the person virtual object 120*b* as the object of interest.

In one embodiment, an object 120 is selected 625 as the object of interest in response to the object being within the area of interest 305 for an area of interest time 230 that exceeds the interest threshold. For example, if the person virtual object 120*b* is within the area of interest 305 for 11 seconds and the interest threshold is 3 seconds, the person virtual object 120*b* may be selected 625 as the object of interest.

In one embodiment, the object of interest is selected 625 in response to a user selection. The user selection may be from one of the sequentially displayed objects 120. The user may enter an indication when the selected object 120 is displayed. Alternatively, the user selection may be from the object outlines. In one embodiment, a label is associated with each object outline and the user may select the associated label to select an object 120.

The embodiments may identify an object of interest and an obstruction object that obscures viewing of the object of interest. The embodiments may further select one of the obstruction object and the object of interest to modify in accordance with the mitigation policy 260. In addition, the embodiments may modify the selected object 120 in accordance with the mitigation policy 260. The embodiments may move the selected object 120. As a result, the user of the augmented reality device 105 may have an unobstructed view of the object of interest, enhancing the augmented reality experience of the user of the augmented reality device 105.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an augmented reality device;
a processor;
a memory that stores code executable by the processor to:
identify an object of interest displayed by the augmented reality device, wherein the object of interest is a virtual object;
identify an obstruction object that obscures viewing the object of interest within the augmented reality device, wherein the obstruction object is a real object;
fade out the obstruction object at an original position that obscures viewing the object of interest; and
concurrently fade in the obstruction object at a new position that does not obscure the object of interest.

2. The apparatus of claim 1, wherein the code is further executable by the processor to identify the object of interest in response to an object of interest flag for the object of interest being set.

3. The apparatus of claim 1, wherein the code is further executable by the processor to identify the object of interest in response to the object of interest being within an area of interest for an area of interest time that exceeds an interest threshold.

4. The apparatus of claim 1, wherein the code is further executable by the processor to sequentially display objects within the augmented reality device.

5. The apparatus of claim 1, wherein the selected object is selected in accordance with the mitigation policy to minimize rendering computation.

6. The apparatus of claim 1, wherein the selected object is selected in accordance with the mitigation policy to render the object of interest in an augmented reality device user line of sight.

7. A method comprising:
identifying, by use of a processor, an object of interest displayed by an augmented reality device, wherein the object of interest is a virtual object;
identifying an obstruction object that obscures viewing the object of interest within the augmented reality device, wherein the obstruction object is a real object;
fading out the obstruction object at an original position that obscures viewing the object of interest; and
concurrently fading in the obstruction object at a new position that does not obscure the object of interest.

8. The method of claim 7, wherein the object of interest is identified in response to an object of interest flag for the object of interest being set.

9. The method of claim 7, wherein the object of interest is identified in response to the object of interest being within an area of interest for an area of interest time that exceeds an interest threshold.

10. The method of claim 7, wherein the method further comprises sequentially displaying objects within the augmented reality device.

11. The method of claim 7, wherein selected object is selected in accordance with the mitigation policy to minimize rendering computation.

12. The method of claim 7, wherein the selected object is selected in accordance with the mitigation policy to render the object of interest in an augmented reality device user line of sight.

13. A program product comprising a computer readable storage medium that stores code executable by a processor, the executable code comprising code to perform:
identifying an object of interest displayed by an augmented reality device. wherein the object of interest is a virtual object;
identifying an obstruction object that obscures viewing the object of interest within the augmented reality device, wherein the obstruction object is a real object;
fading, out the obstruction object at an original position that obscures viewing the object of interest; and
concurrently fading in the obstruction object at a new position that does not obscure the object of interest.

14. The program product of claim 13, wherein the object of interest is identified in response to an object of interest flag for the object of interest being set.

* * * * *